United States Patent [19]

Boyse

[11] Patent Number: 4,865,889
[45] Date of Patent: Sep. 12, 1989

[54] VOID FILLER AND METHOD FOR MANUFACTURE

[75] Inventor: George C. Boyse, Rocklin, Calif.

[73] Assignee: Down River International Inc., San Francisco, Calif.

[21] Appl. No.: 192,410

[22] Filed: May 10, 1988

[51] Int. Cl.⁴ .............................................. B32B 3/12
[52] U.S. Cl. .................................. 428/12; 52/807; 156/197; 428/116; 428/118; 410/154
[58] Field of Search ................. 52/807; 156/197; 206/814; 410/154; 428/12, 116, 118

[56] References Cited

U.S. PATENT DOCUMENTS

| | | | |
|---|---|---|---|
| 2,274,765 | 3/1942 | Zalkind | 428/133 |
| 2,674,295 | 4/1954 | Steele et al. | 156/197 |
| 2,848,132 | 8/1958 | Davous | 428/116 X |
| 3,079,887 | 3/1963 | Doane | 108/51.3 |
| 3,227,599 | 1/1966 | Holland | 428/118 |
| 3,342,666 | 9/1967 | Hull | 428/116 X |
| 3,389,665 | 6/1968 | Kauffman | 428/116 X |
| 3,405,659 | 12/1968 | Hees | 428/116 X |
| 3,493,450 | 2/1970 | Judge, Jr. | 156/197 |
| 3,581,675 | 6/1971 | Kauffman | 410/154 |
| 3,593,671 | 7/1971 | Bramlett | 428/116 X |
| 3,618,535 | 11/1971 | Hees | 410/155 |
| 3,687,767 | 8/1972 | Reisman et al. | 156/207 X |
| 3,709,161 | 1/1973 | Kauffman | 428/116 X |
| 3,823,675 | 7/1974 | Farley | 410/154 |
| 4,007,309 | 2/1977 | Sewell | 428/116 |
| 4,109,587 | 8/1978 | Jansen, Jr. | 410/154 |
| 4,247,237 | 1/1981 | Brown | 410/154 |
| 4,300,864 | 11/1981 | Liebel et al. | 410/154 |
| 4,349,303 | 9/1983 | Liebel et al. | 410/154 |
| 4,363,579 | 12/1983 | Rogers | 410/154 |
| 4,372,717 | 2/1983 | Sewell et al. | 428/116 X |
| 4,386,881 | 8/1983 | Liebel | 410/154 |
| 4,388,354 | 6/1983 | Suominen | 428/12 |
| 4,494,897 | 1/1985 | Rogers | 410/154 |
| 4,516,891 | 5/1985 | Wnuk et al. | 428/116 X |
| 4,585,381 | 4/1986 | Boyse | 410/154 |
| 4,685,986 | 8/1987 | Anderson | 156/197 |

FOREIGN PATENT DOCUMENTS 878255 8/1971 Canada ............................... 428/116

OTHER PUBLICATIONS

Advertising Flyers: Down River Forest Products Inc., "Air Restraint Systems" 6/84.
Down River Forest Products Inc., "Added Strength Gives Added Protection Wood-Kor", 5/82.

Primary Examiner—Henry F. Epstein
Attorney, Agent, or Firm—Townsend and Townsend

[57] ABSTRACT

A collapsible, open cell void filler (2) is made by stacking a series of paper core sheets (58) and gluing the core sheets to one another at appropriate points (56) to create a generally hexagonal open cell core structure when expanded. The stack (60) of core sheets is cut along a series of cutting planes (62) to create rows of independently expandable hexagonal cells (16). The end cells (20) of each row are connected to one another by an outer sheet (18) to create a core slab (68). When the outer sheets are separated, the rows of cells expand from their collapsed, reduced volume condition to their expanded, increased volume condition. As the cells expand they separate laterally from one another along the cutting planes. This eliminates deformation of the cells and permits the full extension of the rows of cells. Deck sheets (6) can be fastened to the outer sheets so that when the core slab is expanded, the deck sheets lie adjacent the open cell ends (28).

17 Claims, 2 Drawing Sheets

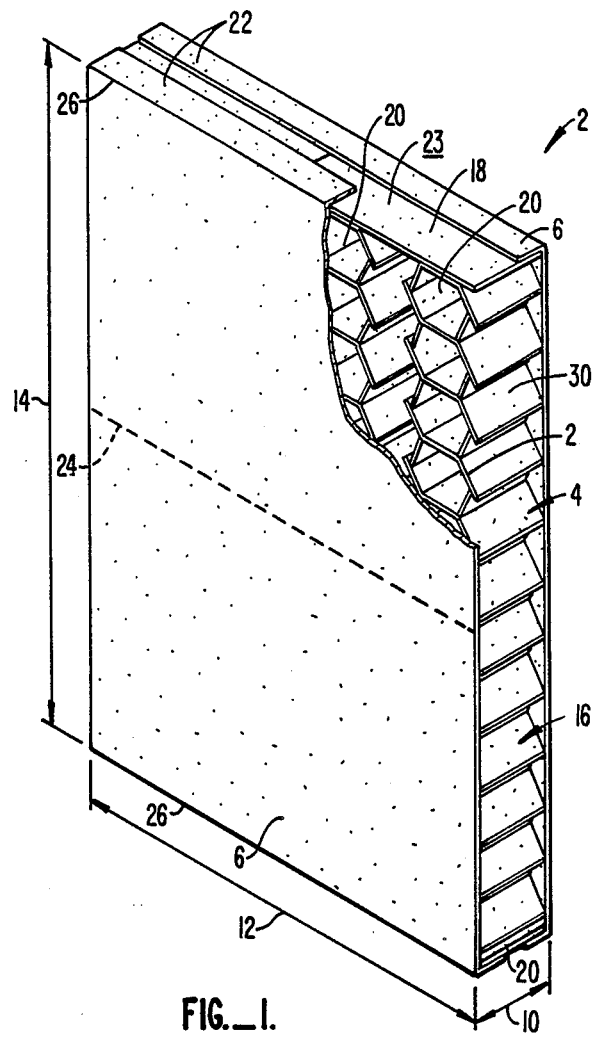
FIG._1.
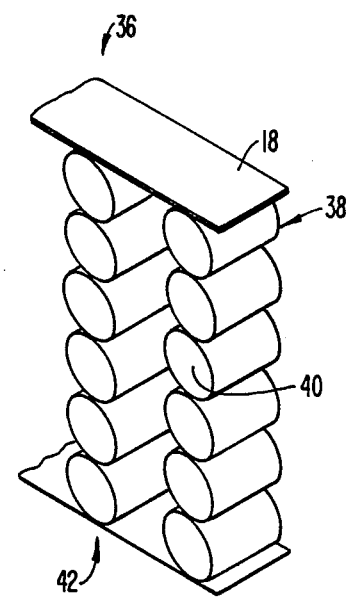
FIG._3.
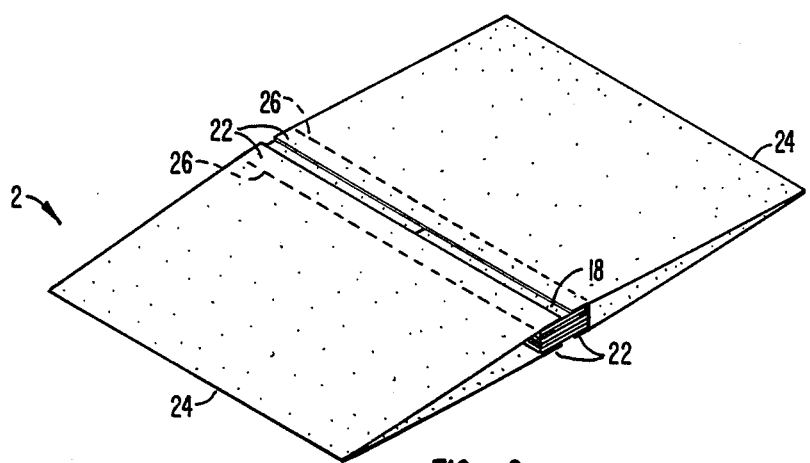
FIG._2.

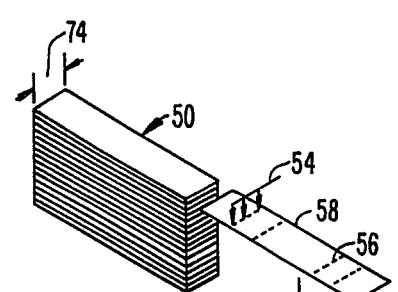
FIG.__4.
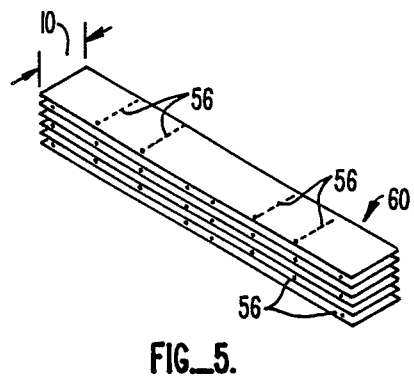
FIG.__5.
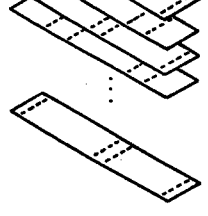
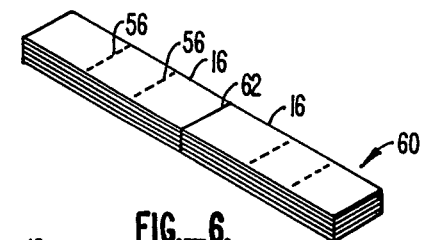
FIG.__6.
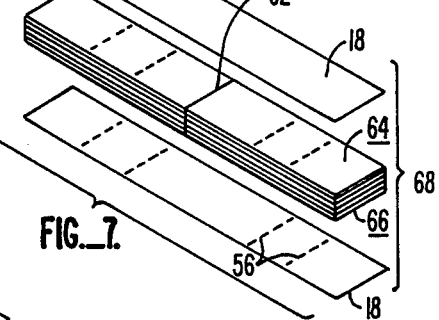
FIG.__7.
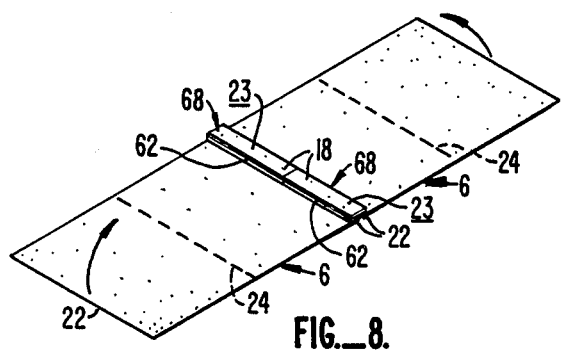
FIG.__8.

VOID FILLER AND METHOD FOR MANUFACTURE

BACKGROUND OF THE INVENTION

Open cell void fillers, typically made from corrugated paper are used for filing voids between cargo during shipping. The cargo may be loaded in a container, on a truck, in a railway boxcar or otherwise. One type of void filler uses a honeycomb-like design with deck sheeting secured to the open ends of the cells to create a lightweight rigid spacer and void filler. An example of this type is sold by Down River Forest Products. Inc. of Sacramento. Calif. as Pal-Kor ® void filler.

Another type of open cell void filler again uses a honeycomb-like material but without the deck sheeting. This type of void filler can collapse for shipping to the user and can then be expanded during use. Down River Forest Products. Inc. also sells this type of void filler as Dor-Kor ® void filler. To keep the collapsible void filler from collapsing when used in a vertical space, various types of hanger attachments can be used so the void filler actually hangs from the top layer of cargo being shipped. When this type of collapsible void filler is used with deck sheets, the resulting structure, when folded flat, is somewhat awkward to ship since the collapsed core increases in height (when collapsed in width) and so extends beyond the ends of the deck sheets. This subjects the collapsed core to damage during shipping as well as making shipping the collapsed void fillers more difficult because of the increased height.

SUMMARY OF THE INVENTION

The present invention is directed to a collapsible void filler and method for making the void filler in which the height and core thickness of the core slab remains substantially constant as the void filler is manipulated between its collapsed, reduced volume condition and its expanded, increased volume condition.

The collapsible void filler can be made by stacking a series of core sheets, gluing the core sheets to one another at appropriate points to create an open cell core structure when expanded. The stack of core sheets is cut along a series of cutting planes to create rows of the cells. The end cells of each row are connected to one another, such as by an outer sheet, to create the core slab. When the outer sheets are separated, the rows of cells expand from their flattened, minimum volume condition to an extended, increased volume condition forming a honeycomb-like structure. As the cells expand they separate laterally from one another along the cutting planes. This eliminates deformation of the cells and permits the full extension of the rows of cells. Deck sheets can be fastened to the outer sheets in a manner so that when the core slab is expanded, the deck sheets lie adjacent the open honeycomb-like ends of the cells.

The preferred embodiment uses generally hexagonal shaped cells made by gluing stacked core sheets to one another and then slitting the glued sheets. However, the rows of cells could be other than hexagonal and could be made by methods other than slitting stacks of core sheets. For example, the core sheets could be pre-slit prior to gluing. Also, the cells could be made from flexible, generally arcuate tubular members fixed along their length into rows, the rows of tubular members secured at their end tubes to one another, typically by the use of an outer sheet at each end of the rows of tubes.

The present invention provides a void filler which is easy to collapse and ship when in its collapsed condition since the height of the core slab and the void filler are substantially constant. The core material does not stick out beyond the outer sheets or deck sheets when the void filler is collapsed. The variable width (which is taken to be the direction of collapsing and expanding) of the void filler is determined only by the number and size of cells in each row of cells. Thus the width can be virtually any width desired. The height of the void filler can be made virtually any dimension desired by either appropriate sizing of the core sheets or by using two or more core slabs placed end to end to construct the void filler.

Other features and advantages of the invention will appear from the following description in which the preferred embodiment has been set forth in detail in conjunction with the accompanying drawings.

BRIEF DESCRIPTION OF THE DRAWINGS

FIG. 1 is a void filler made according to the present invention shown in its expanded, increased volume condition with a portion of a deck sheet cut away to show the spaced apart rows of cells.

FIG. 2 shows the void filler of FIG. 1 in a collapsed, reduced volume condition ready for shipping.

FIG. 3 illustrates an alternative embodiment of the core slab of FIGS. 1 and 2 using generally arcuate tubes as the cells instead of the generally hexagonal cells of the void filler of FIGS. 1 and 2.

FIG. 4 is a schematic illustration showing the stacking of paper core sheets.

FIG. 5 represents the step of affixing the core sheets to one another in a chosen glue pattern.

FIG. 6 schematically illustrates the cutting of the glued stack of core sheets.

FIG. 7 schematically shows adhering the outer sheets to the ends of the cut and glued core sheets of FIG. 4 to create a core slab.

FIG. 8 shows securing and wrapping two deck sheets to two core slabs placed end to end to create the void filler of FIG. 2.

DETAILED DESCRIPTION OF THE PREFERRED EMBODIMENTS

Referring now to FIG. 1, a void filler 2 is shown in its expanded, increased volume condition. Void filler 2 includes generally a core 4 to which deck sheets 6, are secured. Core 4 has a generally constant thickness 10, a generally constant height 12 and a variable width 14. That is, core 4 of void filler 2 does not substantially change its height 12 or thickness 10 as it moves between the expanded condition of FIG. 1 and the collapsed, reduced volume condition of FIG. 2.

Core 4 includes several rows of cells 16 spaced apart along height 12. Core 4 also includes outer sheets 18 which are secured, typically by gluing, to the end cells 20 at each end of each row of cells 16. Deck sheets 6 are sized to correspond to the height 12 of core 4 and are secured at their opposed edges 22 to the outer surfaces 23 of outer sheets 18. Deck sheets 6 include center fold lines 24 and edge fold lines 26 to facilitate manipulation of void filler between the conditions of FIGS. 1 and 2. In the use condition of FIG. 1, the outer edges 28 of the cells 30 constituting rows of cells 16 lie generally adjacent deck sheets 6. Void fillers 2 can be used vertically between stacks of cargo and the walls of a vehicle or vertically between stacks of cargo. When positioned vertically, height 12 is generally positioned vertically to help keep void filler 2 self supporting in its expanded condition. However, void filler 2 can also be used in the orientation of FIG. 1 by either placing the void filler between two stacks of cargo or by fastening the deck sheets to core 4 or to the opposite deck sheet 6 to keep center fold lines 24 from moving away from core 4.

Referring now to FIG. 3, an alternative void filler 36 is shown to include a core 38 made from collapsible arcuate tubes 40 secured to one another to form rows of arcuate cells 42. It can be appreciated in both the embodiments of FIGS. 1 and 3, rows of cells 16, 42 are spaced apart from one another when in the expanded conditions. When collapsed, cells 30, 40 can touch or they can remain spaced apart. However, since the rows of cells are not attached to adjacent rows of cells, the increase in width 14 as void fillers 2, 36 are moved between collapsed and expanded conditions is not restricted by lateral forces exerted among the rows of cells as would occur if the rows were connected. Thus, the cells 30, 40 of cores 4, 38 remain aligned and have generally the same height 12 as void fillers 2, 36 move between expanded and collapsed conditions.

Referring now to FIGS. 4–8, the preferred method for making void filler 2 will be discussed in simplified terms. Sheets 58 of core sheet material, typically corrugated cardboard, are dispensed from a stack 50 of core sheet material 52 past an adhesive station 54. Station 54 applies lines of adhesive 56 to one or more surfaces of core material 52. Material 52 is then stacked. The stacked core sheets 60 are affixed to one another as shown at FIG. 5. The affixation can occur simultaneously with stacking if the adhesive used is a contact adhesive or, for example and depending upon the type of adhesive used, after the application of heat an/or pressure. The particular glue pattern used for the embodiment of FIG. 1, which creates generally hexagonal cells 30, is illustrated in FIGS. 4 and 5.

The stacked core sheets 60 are then cut along a cutting plane 62 (see FIG. 6) to create, in the disclosed embodiment, two rows of cells 16. In practice, stacked core sheets 60 could be sized so that more than one cut is made in stacked core sheets 60 to create more than two rows of cells 16. However, for clarity of illustration an embodiment using only a single cutting plane 62 is shown. At FIG. 7 outer sheets 18 are secured to the upper and lower surfaces 64, 66 of stacked core sheets 60 to create a core slab 68.

At FIG. 8 the wrapping and securement of deck sheets 6 to the outer surfaces 23 of outer sheets 18 of two core slabs 68 placed end to end is shown. The edges 22 of deck sheets 6 are secured to outer surfaces 23 of end sheets 18 using an adhesive to create void filler 2 of FIG. 2. Void filler 2 in its collapsed condition of FIG. 2 can be easily packed and shipped for use elsewhere. By separating outer sheets 18, core 4 is expanded to its expanded condition of FIG. 1 for use.

Modification and variation can be made to the disclosed embodiments without departing from the subject of the invention as defined in the following claims. For example, stack 50 of core sheet material will typically be much wider than suggested in FIG. 4. Stack 50 will typically have a width 74 which is a multiple of core slab thicknesses 10. In such an event the stacked core sheets 60 could be cut along cutting planes 62, to create the rows of cells 16, and also along cutting planes perpendicular to planes 62 to create several stacked core sheets 60. Also, core sheets 58 could be slit at positions corresponding to cutting planes 62 prior to the stacking step of FIG. 4. The preferred embodiment has been shown using outer sheets 18; if desired deck sheets 6 could be affixed directly to faces 64, 66 of stacked core sheets 60.

What is claimed is:

1. A void filler comprising:
   rows of independently collapsible and expandable cells, the rows of cells having a variable dimension as the rows are manipulated between collapsed and expanded conditions, each row including first and second end cells; and
   first and second outer connectors connecting respective first and second end cells of the rows of cells at spaced apart positions to create a core slab.

2. The void filler of claim 1 wherein spaces exist between the rows of cells when the rows of cells are in the expanded condition.

3. The void filler of claim 1 wherein the cells are generally hexagonal in cross-sectional shape.

4. The void filler of claim 1 wherein the cells include generally arcuate tubes.

5. The void filler of claim 1 wherein each cell includes first and second cell ends separated by a constant distance.

6. The void filler of claim 5 further comprising a first deck sheet secured to at least one of the first and second end cells and lying against the first cell ends when the rows of cells are expanded.

7. The void filler of claim 6 further comprising a second deck sheet secured to the first and second end cells and lying against the second cell ends when the rows of cells are expanded.

8. A void filler comprising:
   rows of independently collapsible and expandable hexagonal cells, the rows of cells having a variable dimension as the rows are manipulated between collapsed and expanded conditions, each row including first and second end cells;
   first and second outer connectors connecting respective first and second end cells of the rows of cells at spaced apart positions to create a core slab;
   each cell having first and second cell ends separated by a constant distance so that the core slab has a constant thickness: and
   deck sheeting fastened to the first and second end cells, the deck sheeting being spaced apart from the cell ends when the rows of cells are in the collapsed condition, the deck sheeting lying adjacent the cell ends when the rows of cell are in the expanded condition.

9. A method for making a folding void filler comprising the following steps:
   stacking core sheets;
   affixing adjacent core sheets to one another at selected points to create rows of expandable and collapsible cells, each row of cells including first and second outer end cells at their respective first and second ends, each cell having first and second cell ends;
   cutting the core sheets so the rows of cells can separate from one another when expanded; and
   securing the first outer end cells to one another and the second outer end cells to one another to create a core slab manipulable between a collapsed, reduced volume condition and an expanded, increased volume condition.

10. The method of claim 9 wherein the affixing step is carried out by affixing the adjacent core sheets using lines of adhesive.

11. The method of claim 9 wherein the affixing step is carried out by selecting the selected points to create rows of cells having hexagonal shapes.

12. The method of claim 9 wherein the cutting step is carried out after the affixing step.

13. The method of claim 9 wherein the cutting step is carried out after the stacking step.

14. The method of claim 9 wherein the securing step is carried out by securing first and second end sheets to the first and second outer end cells.

15. The method of claim 9 further comprising the step of securing a first deck sheet to the first outer end cells, the first deck sheet being dimensioned so to lie adjacent the first cell ends when the core slab is in the expanded, increased volume condition.

16. The method of claim 15 wherein the deck sheet securing step is carried out by securing a second deck sheet to the first and second outer end cells to lie adjacent the second cell ends when the core slab is in the expanded, increased volume condition.

17. A method for making a folding void filler comprising the following steps:

stacking core sheets;

affixing adjacent core sheets to one another using lines of adhesive at selected points to create rows of hexagonally-shaped expandable and collapsible cells, each row of cells including first and second outer end cells at their respective first and second ends, each cell having first and second cell ends;

cutting the core sheets so the rows of cells can separate from one another when expanded;

securing the first outer end cells to one another using a first end sheet and the second outer end cells to one another using a second end sheet to create a core slab manipulable between a collapsed, reduced volume condition and an expanded, increased volume condition;

securing a first deck sheet to the first and second outer end cells, the first deck sheet being dimensioned so to lie adjacent the first cell ends when the core slab is in the expanded, increased volume condition; and securing a second deck sheet to the first and second outer end cells, the second deck sheet being dimensioned to lie adjacent the second cell ends when the core slab is in the expanded, increased volume condition.

* * * * *